United States Patent

[11] 3,604,789

| [72] | Inventor | George H. McLafferty |
| | | Manchester, Conn. |
| [21] | Appl. No. | 731,656 |
| [22] | Filed | May 23, 1968 |
| [45] | Patented | Sept. 14, 1971 |
| [73] | Assignee | United Aircraft Corporation |
| | | East Hartford, Conn. |

[54] AERODYNAMIC WINDOW
5 Claims, 1 Drawing Fig.

[52] U.S. Cl. ............................................. 350/319, 331/94.5
[51] Int. Cl. ............................................. G02b 5/00
[50] Field of Search ............................................. 350/319; 331/94.5

[56] References Cited
FOREIGN PATENTS
232,294  3/1964  Austria ........................ 350/319

Primary Examiner—Richard A. Farley
Assistant Examiner—Daniel C. Kaufman
Attorney—Jack N. McCarthy ABSTRACT: An output beam is emitted from a gas-dynamic laser and directed through an opening or port to the atmosphere. The gas pressure on the side of the opening from which the laser beam is emitted is below atmosphere (for example, 0.10 atmosphere) and the pressure on the outside of the opening is atmospheric. To prevent flow in said opening between the atmospheric side of the opening and the low-pressure side of the opening in the gas laser, the beam is directed through an aerodynamic window. The aerodynamic window is an opening formed in the sidewall of a passageway and placed in line with the inlet to the passageway so that a laser beam can pass through the opening and out the inlet, the path being unobstructed by attenuating or disturbing materials. The passageway is formed having an inlet section with a short section of constant area and a faired inlet mouth. At the downstream end of the inlet section the passageway bends at an angle forming a sharp corner and extending away from the proposed path of the laser beam. This side of the passageway extends as a straight line. The side opposite the straight side extends on in the same direction as an extension of the short section of constant area and this curves gradually towards the straight side until it becomes parallel therewith. The passageway then extends until it is connected to suction means to obtain the desired pressure characteristic in the passageway so that ambient air does not flow into the opening in the sidewall of the passageway and into the laser cavity.

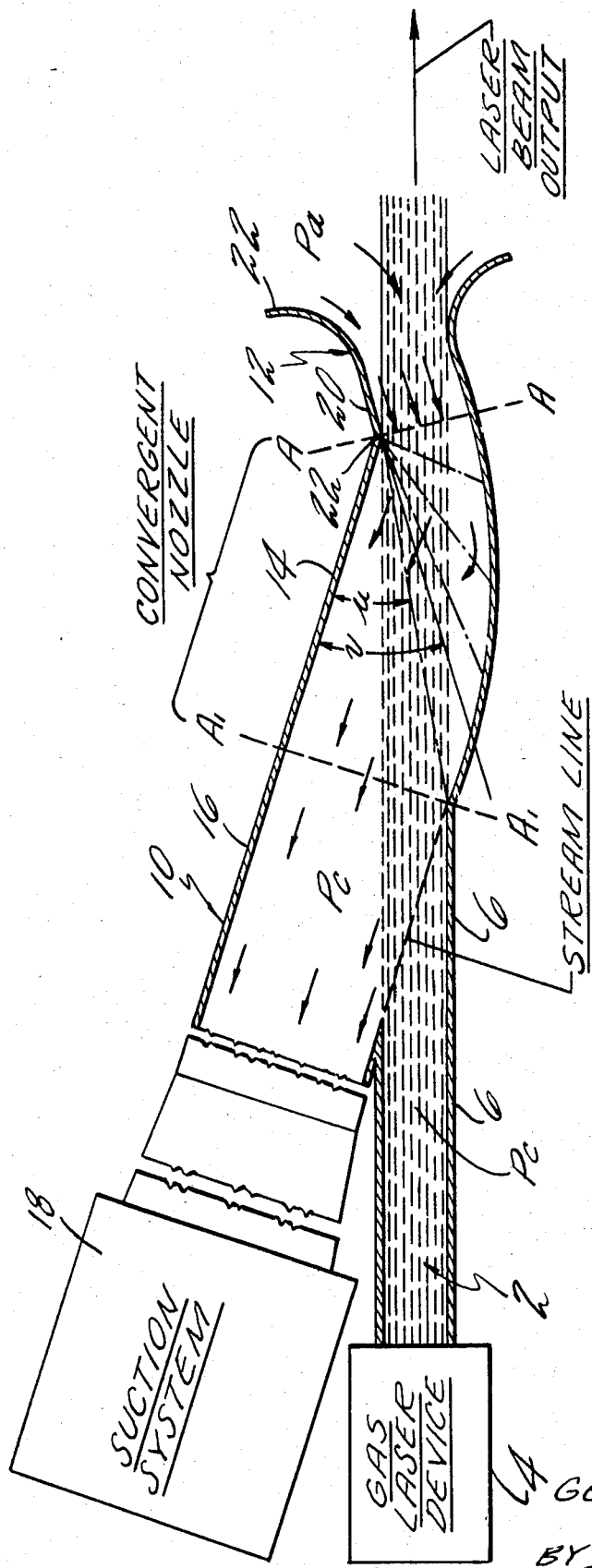

AERODYNAMIC WINDOW

BACKGROUND OF THE INVENTION

This invention relates to aerodynamic windows and particularly for gas-dynamic lasers. In lasers of low power, windows with physical walls made of materials which transmit the laser wavelength have been used, but subject window is for use when the laser beam will disintegrate physical window materials.

SUMMARY OF THE INVENTION

A primary object of the present invention is to provide a window through which a gas-dynamic laser beam can pass between two regions at different pressures with a minimum of distortion.

In accordance with the present invention, a nozzle is formed so that its exit end can be connected to a duct having a suction means. Said means being arranged to suck on said duct and obtain a desired low pressure within the duct so that an opening can be put in the duct adjacent the nozzle with a stream line of flow from said nozzle passing over the opening.

BRIEF DESCRIPTION OF THE DRAWING

This FIGURE is a schematic view showing the use of a laser beam with an aerodynamic window in accordance with the present invention.

DESCRIPTION OF THE PREFERRED EMBODIMENT

In the FIGURE a laser beam 2 is shown being emitted from a gas-laser device 4. The beam 2 passes through a conduit 6 which is connected at one end to the device 4 and at the other end to an aerodynamic window device 10. Both of the connections are made so that no leakage to atmosphere occurs at these points. This can be done by welding or any other suitable means.

The aerodynamic window device comprises four main parts (1) an inlet and nozzle convergent section 12, (2) a nozzle divergent section 14, (3) a duct extension 16, and (4) a suction system 18. The inlet section 12 has a short portion 20 of constant area and a faired inlet mouth 22. The divergent nozzle section 14 is formed having a normal continuous expansion to a desired expansion ratio. The duct extension 16 continues on to the suction system 18 from the end of the nozzle and it is through this duct that a suction is placed on the end of the nozzle.

The divergent nozzle section 14 is formed having one side extending at an angle $v$ from said inlet extending along a straight line, an edge 22 being formed at the entrance to the divergent nozzle. The angle $v$ governs the pressure $P_c$. The other side extends coextensively with the inlet and curves gradually to form a diverging section with the straight side. The nozzle section is formed having a desired expansion ratio to arrive at the proper pressure $P_c$ at the outlet of the nozzle means 14 and in the duct means 16.

As the suction system 18 sucks on the duct means 16 a Prandtl-Meyer expansion wave is formed at the edge 22. The use of this Prandtle-Meyer expansion fan results in a constant pressure in the constant area region following the curved portion of the divergent nozzle means 14. The angles employed through this Prandtl-Meyer expansion fan should be designed so that the pressure of the exit of the nozzle is matched to the pressure in the region in the gas-laser device from which the laser beam emanates. When this match is accomplished there will be no tendency for flow to pass in or out of the laser cavity.

Typical angles involved are approximately as follows. If it is desired for $P_c$ to be 0.1 times ambient pressure, $P_a$, then the Prandtl-Meyer turning angle, $v$, should be approximately 30.4° and the Mach angle, $\eta$, should be approximately 27.7°. The corresponding ratio of flow area at the nozzle exit-to-throat area would be approximately 1.92. Other combinations of angles and areas, determined from standard aerodynamic relationships, would be chosen for other values of $P_c$. In a window successfully tested the cross section was rectangular.

It is to be understood that the invention is not limited to the specific description above or specific figures shown, but may be used in other ways without departure from its spirit as defined by the following claims.

1. A device for providing an aerodynamic window for the passage of a beam between two regions at different pressures including in combination, a passageway having an inlet and outlet, divergent nozzle means having one side extending at an angle from said outlet in approximately a straight line and the other side extending coextensively with the outlet and curving gradually to form a diverging section with said straight side thereby forming a desired expansion ratio, duct means extending from the expansion end of the nozzle means, suction means connected to the free end of said duct means for creating a negative pressure therein, an opening in said duct means adjacent the nozzle means, said suction means sucking the fluid from the higher pressure region into said nozzle means and duct means so that a surface of stream lines appears across said opening in said duct means.

2. A combination as set forth in claim 1 wherein a distinct edge is formed where the one side of said convergent nozzle means extends from said outlet so that a Prandtl-Meyer expansion fan results.

3. A combination as set forth in claim 1 wherein said opening is aligned with said passageway so that a beam can pass directly in a straight line through both opening and passageway.

4. A combination as set forth in claim 1 wherein said desired expansion ratio is selected to match the pressure of the exit of the nozzle means with the pressure of the fluid at the low pressure region.

5. A device for providing an aerodynamic window for the passage of a beam between two regions at different pressures including in combination, a passageway having an inlet and outlet, divergent-nozzle means, having one side extending at an angle from said outlet in a straight line and the other side extending coextensively with the outlet and curving gradually to form a diverging section with said straight side thereby forming a desired expansion ratio, duct means extending from the expansion end of the nozzle means, suction means connected to the free end of said duct means for creating a negative pressure therein, an opening in said duct means adjacent the nozzle means, a device for emitting a beam therefrom having a low pressure region therein, said device having a hole for the passage of the beam, a conduit connection the device to said duct to carry the beam, said closed passage extending from around the hole of said device to around the opening in said duct means, said conduit being in line with the passageway so that said beam passes through said conduit and said passageway, said suction means sucking the fluid from the higher pressure region into said nozzle means and duct means so that a surface of stream lines appears across said opening in said duct means.